(12) United States Patent
Cavender et al.

(10) Patent No.: US 9,151,866 B2
(45) Date of Patent: Oct. 6, 2015

(54) DOWNHOLE TELEMETRY SYSTEM USING AN OPTICALLY TRANSMISSIVE FLUID MEDIA AND METHOD FOR USE OF SAME

(75) Inventors: Travis Cavender, Angleton, TX (US); Kevin Fink, Frisco, TX (US); Vince Zeller, Flower Mound, TX (US); Roger Schultz, Ninnekah, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 730 days.

(21) Appl. No.: 13/463,661

(22) Filed: May 3, 2012

(65) Prior Publication Data

US 2012/0218119 A1 Aug. 30, 2012

Related U.S. Application Data

(63) Continuation of application No. 12/173,851, filed on Jul. 16, 2008, now abandoned.

(51) Int. Cl.
| | | |
|---|---|---|
| *G01V 3/00* | (2006.01) | |
| *E21B 47/18* | (2012.01) | |
| *G01V 11/00* | (2006.01) | |

(52) U.S. Cl.
CPC .................................. *G01V 11/002* (2013.01)

(58) Field of Classification Search
USPC .................. 340/853.1–856.4; 367/25–35, 76, 367/81–86
See application file for complete search history.

(56) References Cited

U.S. PATENT DOCUMENTS

| | | |
|---|---|---|
| 4,162,400 A | 7/1979 | Pitts, Jr. |
| 5,363,095 A | 11/1994 | Norman et al. |
| 5,579,842 A | 12/1996 | Riley |
| 5,691,809 A | 11/1997 | Tackett et al. |
| 5,744,803 A | 4/1998 | Grodsinsky et al. |
| 5,796,504 A | 8/1998 | Sonderegger et al. |
| 6,018,501 A | 1/2000 | Smith et al. |
| 6,040,571 A | 3/2000 | Hodgson et al. |
| 6,177,882 B1 | 1/2001 | Ringgenberg et al. |
| 6,246,962 B1 | 6/2001 | Schultz et al. |
| 6,249,622 B1 | 6/2001 | Hodgson |
| 6,269,198 B1 | 7/2001 | Hodgson et al. |
| 6,271,766 B1 | 8/2001 | Didden et al. |
| 6,288,975 B1 | 9/2001 | Frederick et al. |

(Continued)

FOREIGN PATENT DOCUMENTS

| | | |
|---|---|---|
| GB | 1605155 | 6/1982 |
| GB | 2377131 | 12/2002 |
| GB | 2399971 | 9/2004 |

OTHER PUBLICATIONS

Halliburton, DynaLink Telemetry System, Jan. 2008.

*Primary Examiner* — Firmin Backer
*Assistant Examiner* — Jerold Murphy

(57) ABSTRACT

A multi-channel downhole telemetry system for enabling communication in a wellbore. The system includes a downhole transmitter operable to optically transmit a first data stream on a first optical channel and a second data stream on a second optical channel. A downhole receiver is operable to receive the first data stream and the second data stream. An optically transmissive fluid disposed in the wellbore provides a medium for the optical transmission of the first data stream and the second data stream between the downhole transmitter and the downhole receiver. The optically transmissive fluid contains suspended solids having refraction surfaces that scatter the optically transmitted data streams in the wellbore.

20 Claims, 5 Drawing Sheets

(56) References Cited

U.S. PATENT DOCUMENTS

| | | |
|---|---|---|
| 6,343,649 B1 | 2/2002 | Beck et al. |
| 6,513,599 B1 | 2/2003 | Bixenman et al. |
| 6,554,064 B1 | 4/2003 | Restarick et al. |
| 6,554,065 B2 | 4/2003 | Fisher et al. |
| 6,684,951 B2 | 2/2004 | Restarick et al. |
| 6,724,319 B1 | 4/2004 | Knaack et al. |
| 6,728,165 B1 | 4/2004 | Roscigno et al. |
| 6,859,419 B1 | 2/2005 | Blackmon et al. |
| 6,899,178 B2 | 5/2005 | Tubel |
| 6,933,856 B2 | 8/2005 | Schultz |
| 6,983,796 B2 | 1/2006 | Bayne et al. |
| 7,042,367 B2 | 5/2006 | Gardner et al. |
| 7,063,146 B2 | 6/2006 | Schultz et al. |
| 7,100,690 B2 | 9/2006 | Mullen et al. |
| 7,104,331 B2 | 9/2006 | Bussear et al. |
| 7,123,162 B2 | 10/2006 | Mackenzie et al. |
| 7,140,437 B2 | 11/2006 | McMechan et al. |
| 7,234,519 B2 | 6/2007 | Fripp et al. |
| 7,249,636 B2 | 7/2007 | Ohmer |
| 7,256,706 B2 | 8/2007 | Haase et al. |
| 7,261,162 B2 | 8/2007 | Deans et al. |
| 7,720,323 B2 | 5/2010 | Yamate et al. |
| 2002/0144842 A1 | 10/2002 | Schultz et al. |
| 2002/0154572 A1* | 10/2002 | Mackenzie et al. ............. 367/83 |
| 2003/0150395 A1 | 8/2003 | Mauderli et al. |
| 2003/0192692 A1 | 10/2003 | Tubel |
| 2004/0035199 A1 | 2/2004 | Meister et al. |
| 2005/0074196 A1 | 4/2005 | Grigsby et al. |
| 2005/0107079 A1 | 5/2005 | Schultz et al. |
| 2005/0126777 A1* | 6/2005 | Rolovic et al. ............. 166/255.1 |
| 2005/0236161 A1 | 10/2005 | Gay et al. |
| 2005/0274513 A1 | 12/2005 | Schultz et al. |
| 2006/0065444 A1 | 3/2006 | Hall et al. |
| 2006/0132792 A1 | 6/2006 | Schultz et al. |
| 2006/0289172 A1 | 12/2006 | Miller et al. |
| 2007/0000667 A1 | 1/2007 | MacKenzie et al. |
| 2007/0109537 A1 | 5/2007 | Vannuffelen et al. |
| 2007/0120051 A1 | 5/2007 | DiFoggio et al. |
| 2007/0125535 A1 | 6/2007 | Coronado |
| 2007/0206440 A1 | 9/2007 | Fripp et al. |
| 2007/0281867 A1 | 12/2007 | Massam et al. |
| 2008/0030365 A1 | 2/2008 | Fripp et al. |
| 2008/0030367 A1 | 2/2008 | Fink et al. |
| 2008/0066962 A1 | 3/2008 | Rolovic et al. |
| 2008/0130412 A1 | 6/2008 | Fink et al. |
| 2008/0180273 A1 | 7/2008 | Kyle et al. |
| 2009/0016725 A1* | 1/2009 | Chouzenoux et al. .......... 398/79 |

* cited by examiner

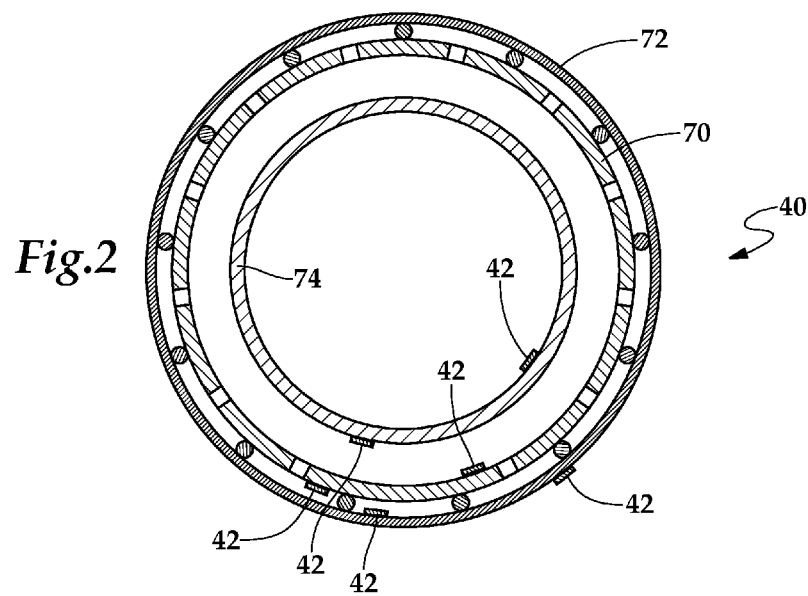
*Fig.2*
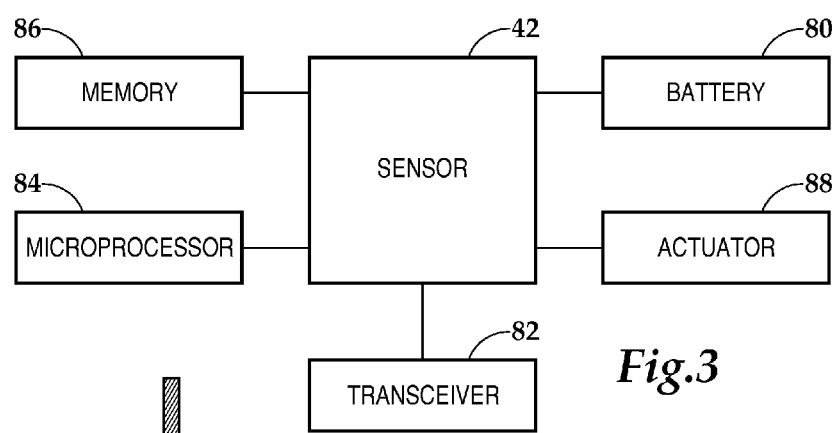
*Fig.3*
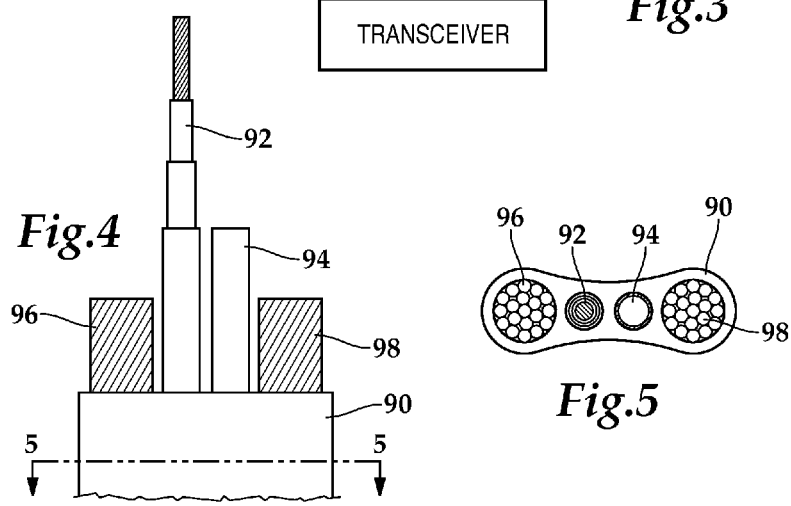
*Fig.4*
*Fig.5*

DOWNHOLE TELEMETRY SYSTEM USING AN OPTICALLY TRANSMISSIVE FLUID MEDIA AND METHOD FOR USE OF SAME

CROSS-REFERENCE TO RELATED APPLICATIONS

This is a continuation application of co-pending application Ser. No. 12/173,851, entitled Downhole Telemetry System Using an Optically Transmissive Fluid Media and Method for Use of Same, filed Jul. 16, 2008.

TECHNICAL FIELD OF THE INVENTION

This invention relates, in general, to communication systems for transmitting data between downhole equipment and surface equipment and, in particular, to a downhole telemetry system that transmits optical signals via an optically transmissive fluid media disposed in a wellbore.

BACKGROUND OF THE INVENTION

Without limiting the scope of the present invention, its background is described with reference to sand control completions, as an example.

It is well known in the subterranean well drilling and completion art that relatively fine particulate materials may be produced during the production of hydrocarbons from a well that traverses an unconsolidated or loosely consolidated formation. Numerous problems may occur as a result of the production of such particulate. For example, the particulate causes abrasive wear to components within the well, such as tubing, flow control devices, safety devices and the like. In addition, the particulate may partially or fully clog the well creating the need for an expensive workover. Also, if the particulate matter is produced to the surface, it must be removed from the hydrocarbon fluids using surface processing equipment.

One method for preventing the production of such particulate material is to gravel pack the well adjacent to the unconsolidated or loosely consolidated production interval. In a typical gravel pack completion, a sand control screen is lowered into the wellbore on a work string to a position proximate the desired production interval. A fluid slurry including a liquid carrier and a relatively coarse particulate material, such as sand, gravel or proppants, which are typically sized and graded and which are typically referred to herein as gravel, is then pumped down the work string and into the well annulus formed between the sand control screen and the perforated well casing or open hole production zone.

The liquid carrier either flows into the formation or returns to the surface by flowing through a wash pipe or both. In either case, the gravel is deposited around the sand control screen to form the gravel pack, which is highly permeable to the flow of hydrocarbon fluids but blocks the flow of the fine particulate materials carried in the hydrocarbon fluids. As such, gravel packs can successfully prevent the problems associated with the production of these particulate materials from the formation.

In other cases, it may be desirable to stimulate the formation by, for example, performing a formation fracturing and propping operation prior to or simultaneously with the gravel packing operation. This type of treatment process is commonly referred to as a frac pack. During this treatment process, hydraulic fractures are created in the hydrocarbon bearing formation, which increase the permeability of the formation adjacent the wellbore. According to conventional practice, a fracture fluid such as water, oil, oil/water emulsion, gelled water or gelled oil is pumped down the work string with sufficient volume and pressure to open multiple fractures in the production interval.

The fracture fluid may carry a suitable propping agent, such as sand, gravel or proppants, which are typically referred to herein as proppants, into the fractures for the purpose of holding the fractures open following the fracturing operation. In addition, these proppants are deposited around the sand control screen to form the gravel pack as described above. As such, frac packs can successfully enhance fluid production from the formation while also preventing the production of particulate materials from the formation.

Typically, downhole parameters such as pressure and temperature are obtained and recorded during such treatment processes with one or more downhole sensors. The information obtained by the sensors is later downloaded into surface or remote computers once the treatment operation is complete and the sensors have been tripped out of the wellbore. It has been found, however, that the quality of the treatment operation is evaluated only after such downhole sensors are brought to the surface. As such, the information obtained by the sensors is not supplied in a manner timely enough to allow modifications to the treatment operation.

Accordingly, a need has arisen for a communication system for transmitting data between downhole equipment and surface equipment that is operable to provide real-time information relating to parameters and conditions downhole such that modifications to a treatment operation may occur, if desired.

SUMMARY OF THE INVENTION

The present invention disclosed herein provides a communication system for transmitting data between downhole equipment and surface equipment. The system of the present invention is operable to provide real-time information relating to parameters and conditions downhole such that modifications to a treatment operation may occur, if desired.

In one aspect, the present invention is directed to a multi-channel downhole telemetry system disposed within a wellbore. The system includes a downhole transmitter operable to optically transmit a first data stream on a first optical channel and a second data stream on a second optical channel. A downhole receiver is operable to receive the first data stream and the second data stream. An optically transmissive fluid disposed in the wellbore provides a medium for the optical transmission of the first data stream and the second data stream between the downhole transmitter and the downhole receiver. The optically transmissive fluid contains suspended solids having refraction surfaces that scatter the optically transmitted data streams in the wellbore.

In one embodiment, data transmissions on the first optical channel use a different wavelength than data transmissions on the second optical channel. In another embodiment, data transmissions on the first optical channel use a different monochromatic beam than data transmissions on the second optical channel. In certain embodiments, the optical transmission of the first data stream and the second data stream between the downhole transmitter and the downhole receiver occurs simultaneously. In some embodiment, a tubular string supports the downhole transmitter and the downhole receiver and the optically transmissive fluid is disposed in at least one of an annulus between the tubular string and the wellbore and an interior of the tubular string. In one embodiment, the downhole transmitter is positioned uphole of the downhole receiver. In another embodiment, the downhole transmitter is positioned downhole of the downhole receiver. In certain embodiments, the first and second data streams include at least one of surface commands and downhole data.

In another aspect, the present invention is directed to a multi-channel downhole telemetry system disposed within a wellbore. The system includes a downhole transmitter operable to optically transmit a first data stream on a first optical channel and a second data stream on a second optical channel. A downhole repeater is operable to receive the first data stream and the second data stream and operable to optically retransmit the first data stream on a third optical channel and the second data stream on a fourth optical channel. A downhole receiver is operable to receive the first data stream and the second data stream. An optically transmissive fluid disposed in the wellbore provides a medium for the optical transmission of the first data stream and the second data stream between the downhole transmitter and the downhole repeater and for the optical retransmission of the first data stream and the second data stream between the downhole repeater and the downhole receiver. The optically transmissive fluid contains suspended solids having refraction surfaces that scatter the optically transmitted data streams in the wellbore.

In one implementation, data transmissions on the first optical channel use a different wavelength than data transmissions on the second optical channel and data transmissions on the third optical channel use a different wavelength than data transmissions on the fourth optical channel. For example, data transmissions on the first optical channel may use a different monochromatic beam than data transmissions on the second optical channel and data transmissions on the third optical channel may use a different monochromatic beam than data transmissions on the fourth optical channel. In one embodiment, the optical transmission of the first data stream and the second data stream between the downhole transmitter and the downhole repeater occurs simultaneously. In certain embodiments, the optical transmission of the first data stream and the second data stream between the downhole repeater and the downhole receiver occurs simultaneously. In some embodiment, a tubular string supports the downhole transmitter, the downhole repeater and the downhole receiver and the optically transmissive fluid is disposed in at least one of an annulus between the tubular string and the wellbore and an interior of the tubular string. In one embodiment, a plurality of downhole repeaters are disposed within the wellbore between the downhole transmitter and the downhole receiver, each of the downhole repeaters operable to receive the first and second data streams and to optically retransmit the first and second data streams.

In a further aspect, the present invention is directed to a multi-channel downhole method for transmitting data within a wellbore. The method includes disposing an optically transmissive fluid within the wellbore to provide a medium for optical transmission of data; optically transmitting a first data stream on a first optical channel through the optically transmissive fluid; optically transmitting a second data stream on a second optical channel through the optically transmissive fluid; scattering the optically transmitted data streams in the wellbore using refraction surfaces of suspended solids in the optically transmissive fluid; and receiving the first and second data streams.

The method may include using different wavelengths for data transmissions on the first optical channel and data transmissions on the second optical channel, using different monochromatic beams for data transmissions on the first optical channel and data transmissions on the second optical channel, optically transmitting the first data stream on the first optical channel and optically transmitting the second data stream on the second optical channel simultaneously and/or after receiving the first and second data streams, optically retransmitting the first data stream on a third optical channel through the optically transmissive fluid and optically retransmitting the second data stream on a fourth optical channel through the optically transmissive fluid.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a cross sectional view taken of a gravel packing apparatus having integrated sensors for operation in the downhole telemetry system of the present invention;

FIG. 3 is a block diagram of a sensor for operation in the downhole telemetry system of the present invention;

FIG. 4 is a side view of a flat pack wire bundle for use the downhole telemetry system of the present invention;

FIG. 5 is a cross sectional view taken along line 5-5 of FIG. 4 of a flat pack wire bundle for use the downhole telemetry system of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
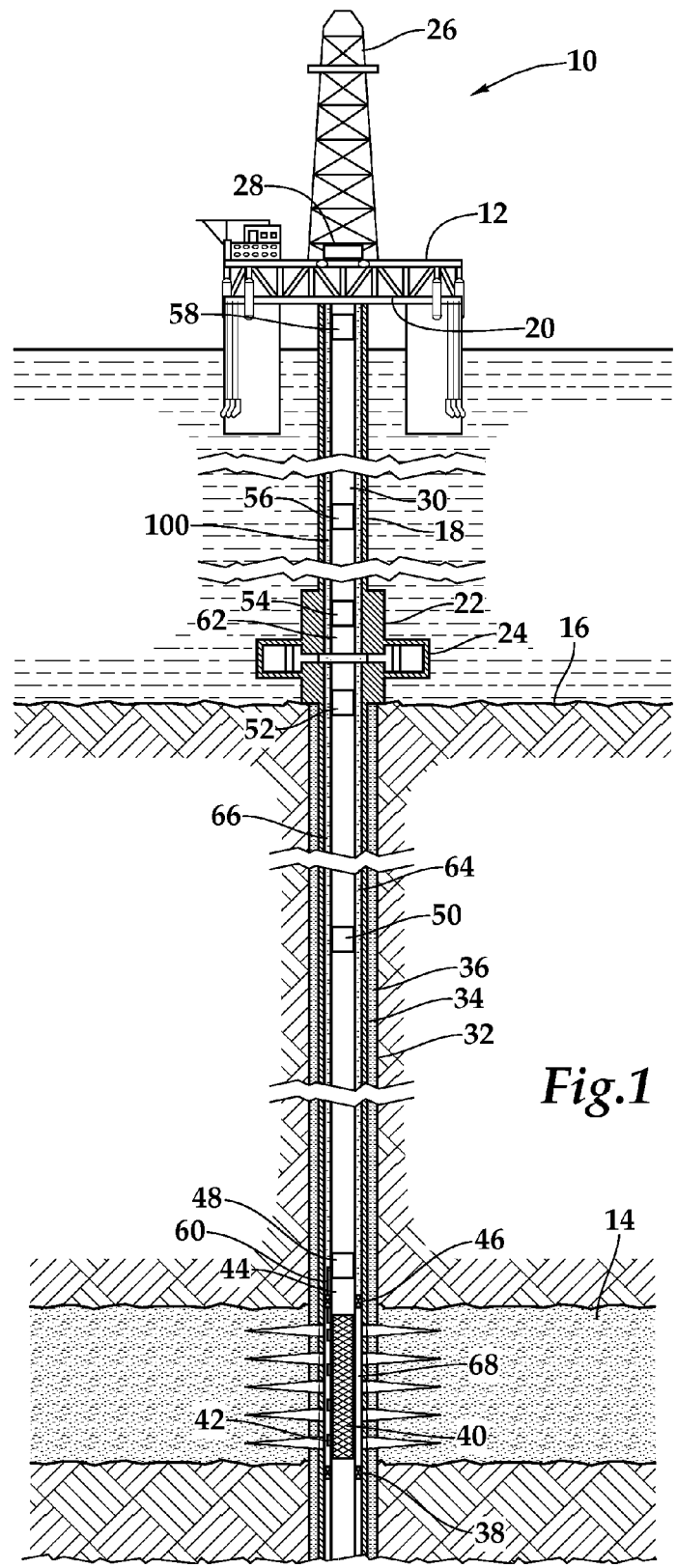
FIG. 1 is a schematic illustration of a offshore oil and gas platform positioned over a well that traverses a hydrocarbon bearing subterranean formation in which an embodiment of a downhole telemetry system of the present invention is operating.

Referring initially to FIG. 1, a downhole telemetry system including a series of optical communication components in use in a well is schematically illustrated and generally designated 10. A semi-submergible platform 12 is centered over a submerged oil and gas formation 14 located below sea floor 16. A subsea conduit 18 extends from deck 20 of platform 12 to wellhead installation 22 including blowout preventers 24. Platform 12 has a derrick 26 and a hoisting apparatus 28 for raising and lowering pipe strings including a work string 30. Work string 30 is positioned within well 32 having casing 34 that has been secured within well 32 by cement 36. In the illustrated embodiment, work string 30 includes a sump packer 38, a gravel packing apparatus or sand screen 40 including a plurality of sensors 42 and a crossover assembly 44 including a gravel packer 46. Work string 30 also includes a plurality of optical communication components 48, 50, 52, 54, 56 and 58. A wired communication link 60 that passes through gravel packer 46 provides a communication medium for communication between sensors 42 and optical communication component 48. Similarly, a wired communication link disposed within pipe segment 62 provides a communication medium for communication between optical communication component 52 and optical communication component 54 across blowout preventers 24. Optical transmission between various optical communication components is achieved via an optically transmissive fluid medium 64 disposed within annulus 66, the interior of work string 30 or both.

A typical completion process using gravel packing apparatus 40 having integrated sensors 42 will now be described. First, the production interval 68 adjacent to formation 14 is isolated. Packer 46 seals the upper end of production interval 68 and packer 38 seals the lower end of production interval 68. Crossover assembly 44 is located adjacent to gravel packing apparatus 40, traversing packer 46 with portions of crossover assembly 44 on either side of packer 46. When the gravel packing operation commences, the objective is to uniformly and completely fill the production interval 68 with gravel. To help achieve this result, a wash pipe is disposed within gravel packing apparatus 40. The wash pipe extends into crossover assembly 44 such that return fluid passing through gravel packing apparatus 40 may travel through the wash pipe and into annulus 66 for return to the surface.

The fluid slurry containing gravel is pumped down work string 30 into crossover assembly 44. The fluid slurry containing gravel exits crossover assembly 44 through a series of crossover ports and is discharged into annular interval 68, such that the gravel drops out of the slurry and builds up from formation 14, filling the perforations and annular interval 68 around gravel packing apparatus 40 forming the gravel pack. Some of the carrier fluid in the slurry may leak off through the perforations into formation 14 while the remainder of the carrier fluid passes through gravel packing apparatus 40, that is sized to prevent gravel from flowing therethrough. The fluid flowing back through gravel packing apparatus 40, as explained above, flows back to the surface. This process progresses along the entire length of gravel packing apparatus 40 such that annular interval 68 becomes completely packed with the gravel. Once annular interval 68 is completely packed with gravel, the gravel pack operation may cease.

Throughout the gravel placement process, sensors 42 that are operably associated with gravel packing apparatus 40 and wired communication link 60 are used to monitor the entire gravel packing operation and provide substantially real time data relating to the gravel placement. Sensors 42 are position in a variety of circumferential, axial and radial locations relative to gravel packing apparatus 40. For example, as seen in FIG. 2, gravel packing apparatus 40 includes sensors 42 positioned on the outer and inner surfaces of base pipe 70, the outer and inner surfaces of screen wire 72 and on the outer and inner surfaces of wash pipe 74. Sensors 42 may be any one or more of the following types of sensors, including pressure sensors, temperature sensors, piezoelectric acoustic sensors, flow meters for determining flow rate, accelerometers, resistivity sensors for determining water content, velocity sensors, weight sensors or any other sensor that measures a fluid property or physical parameter downhole. As used herein, the term sensor shall include any of these sensors as well as any other types of sensors, such as fiber optic distributed temperature sensors, that are used in downhole environments and the equivalents to these sensors.

As illustrated in FIG. 3, a sensor 42 can be powered by a battery 80. In the illustrated embodiment, sensor 42 is coupled to transceiver 82 that is used to transmit data and receive instructions between sensor 42 and the surface or between sensor 42 and another downhole system. Sensor 42 has a microprocessor 84 associated therewith to allow for manipulation and interpretation of the sensor data and for processing the received instructions. Likewise, sensor 42 is coupled to a memory 86 which provides for storing information for later batch processing or batch transmission, if desired. Importantly, this combination of components provides for localized control and operation of an actuator 88 which may be a flow control device, such as a sliding sleeve, associated with gravel packing apparatus 40 to selectively permit and prevent fluid flow therethrough or which may be a safety device or other actuatable downhole device.

Referring again to FIG. 1, sensors 42 provide substantially real time data on the effectiveness of the treatment operation. For example, during a gravel packing operation, voids may be identified during the gravel placement process that allow the operator to adjust treatment parameters such as pump rate, gravel concentration, fluid viscosity and the like to overcome deficiencies in the gravel pack. This real time data is then sent to the surface via the downhole telemetry system of the present invention. As a first step, the data collected sensors 42 is encoded into electrical signals utilizing, for example, "1" and "0" for information transmission. The encoded electrical signal is then transmitted to optical communication component 48 via wired communication link 60.

Optical communication component 48 operates as a transducer to convert the digitally encoded electrical signal into a digitally encoded optical data stream in the form of light radiation such as a laser. In a preferred embodiment, optical communication component 48 emits coherent light radiation in a narrow, low-divergence monochromatic beam with a well-defined wavelength. Optical communication component 48 includes a transmitter that transmits the optical data stream to optical communication component 50 that includes a receiver. The optical data stream is sent in annulus 66 which contains an optically transmissive fluid medium 64. Suitable optically transmissive fluids include clear fluids such as water as well as fluids containing various suspended particles such as brines that may includes salts such as sodium chloride, sodium formate, calcium chloride, calcium bromide, zinc chloride, zinc bromide, potassium chloride, potassium bromide, potassium formate, caesium formate and the like. Optically transmissive fluid medium 64 may alternatively or additionally include other suspended particles including engineered particles of glass or polymers preferably having flat surfaces or other desirable refraction surfaces.

In a highly optically transmissive medium, the digitally encoded optical data stream will tend to travel in the straight path maintaining its narrow beam format. As most wellbores do not provide a straight path, the optically transmissive fluid medium of the present invention uses the suspended particles to scatter the light beam, thus allowing the information carried in the digitally encoded optical data stream to travel between the optical communication components of the present invention. Specifically, scattering allows the digitally encoded optical data stream to deviate from a straight trajectory due to the localized non-uniformities created by the suspended particles in optically transmissive fluid medium 64. As the suspended particles in optically transmissive fluid medium 64 cause a large number of scattering events of the digitally encoded optical data stream, the path of the digitally encoded optical data stream diffuses to fill the entire annulus 66 with light radiation.

In the illustrated embodiment, optical communication component 50 is positioned between optical communication component 48 and optical communication component 52 to provide amplification and repeater functionality. Specifically, optical communication component 50 is positioned relative to optical communication component 48 such that the light radiation intensity is sufficient at optical communication component 50 to read the data digitally encoded within the optical data stream. Preferably, optical communication component 50 optically or electrically processes the data stream and retransmits the data stream as another digitally encoded optical data stream to optical communication component 52.

Even though FIG. 1 depicts three optical communication components disposed within wellbore 32 below sea floor 16, those skilled in the art will recognize that the number of optical communication components needed in a given installation will depend on factors including the length of the wellbore, the optical transmissivity of the fluid medium, the concentration of suspended particles, the strength and type of light radiation used and the like. Accordingly, any number of optical communication components, each having a transmitter and a receiver, may serve as repeaters without departing from the principles of the present invention.

In the illustrated embodiment, optical communication component 52 includes a transducer that converts the digitally encoded optical data stream to an electrical signal such that the data stream may be passed through blowout preventers 24. Specifically, as blowout preventers 24 create a discontinuity in the optically transmissive fluid medium 64, another communication mode is used. In this embodiment, a wired communication link disposed within pipe segment 62 provides a communication medium for communication between optical communication component 52 and optical communication component 54 across blowout preventers 24. Specifically, as best seen in FIGS. 4 and 5, a flat pack umbilical line 90 may be used to provide the wired communication link. In the illustrated embodiment, umbilical line 90 includes an instrument line 92, such as a copper wire, a coaxial cable, a fiber optic bundle, a twisted pair or other line suitable for transmitting signals, data and the like, and a hydraulic line 94. In addition, umbilical line 90 includes a pair of bumper bars 96, 98 such as braided wire, which provides added rigidity to umbilical line 90. Alternatively, instead of including hydraulic line 94, certain embodiments of umbilical line 90 could utilize a pair of instrument lines. Also, instead of being disposed within pipe segment 62, a wired communication link could alternatively be disposed exteriorly of pipe segment 62 or could be embedded or integrated within pipe segment 62.

Continuing on the communication path depicted in FIG. 1, the encoded electrical signal is transmitted to optical communication component 54 from the wired communication link associated with pipe segment 62. Optical communication component 54 operates as a transducer to convert the digitally encoded electrical signal into a digitally encoded optical data stream. As illustrated, the optical data stream is transmitted from optical communication component 54 to optical communication component 56 in annulus 100 which contains optically transmissive fluid medium 64. Optical communication component 56 provides amplification and repeater functionality by optically or electrically processing the data stream and retransmitting the data stream as another digitally encoded optical data stream to optical communication component 58. Optical communication component 58 preferably includes a transducer that converts the digitally encoded optical data stream to an electrical signal such that the data stream may be passed to a surface computer for further processing and analysis.

As large amounts of information can be transmitted optically in substantially real time using the present invention, the information may be used to make changes in the treatment process that enhance the quality of the treatment process. As one example, it may be desirable to open certain sliding sleeves or valves associated with the wash pipe disposed within gravel packing apparatus 40 such that the return path for fluids is altered. In this case, such a command can be sent to the appropriate sensor 42 that can actuate such a sliding sleeve or valve. The command can be sent using the telemetry system described above as a downlink. Specifically, a digitally encoded electrical command may be sent to optical communication component 58 that converts the digitally encoded electrical command into a digitally encoded optical command which is sent via optically transmissive fluid medium 64 to optical communication component 56 which in turn retransmits the digitally encoded optical command for receipt by optical communication component 54. The command is then send from optical communication component 54 to optical communication component 52 via the wired communication link disposed within pipe segment 62. The optical retransmission continues from optical communication component 52 to optical communication component 50 and finally to optical communication component 48 which converts the digitally encoded optical command to a digitally encoded electrical command that is sent to the appropriate sensor 42 via wired communication link 60. Actuator 88 of sensor 42 then causes the actuation of the desired sliding sleeve or valve. In using the telemetry system of the present invention as a downlink, it may be desirable to use a beam of coherent light radiation in a narrow, low-divergence monochromatic beam with a different well-defined wavelength than that used for data communication in the uphole direction. Likewise, multiple beams of coherent light radiation in a narrow, low-divergence monochromatic beam with different well-defined wavelengths can be used simultaneously to provide multiple channels of communication in either the uphole direction, the downhole direction or both.

The telemetry system of the present invention may also be used to enhance a frac pack operation. In certain frac pack completions, it is desirable to perform a mini frac prior to performing the full fracture stimulation and gravel packing treatment. Typically, the mini frac is performed using a relative small volume of frac fluid to test the formation response to the proposed treatment regime. In such a treatment scenario, the frac fluid is pumped down work string 30, through crossover assembly 44 into annular interval 68, through the perforations and into formation 14 without taking return fluids. During this process, sensors 42 are used to monitor various aspects of the mini frac, such as temperature and pressure at various locations and particularly temperature during the bleed-off period. As the mini frac is relatively short in duration, the data obtained during the mini frac is preferably stored by sensors 42 until the mini frac is complete. At this point, it may be desirable to circulate an optically transmissive fluid into the well through which the digitally encoded optical data stream generated by the optical communication components may be transmitted. Following the communication path described above, the data obtained by sensors 42 may be sent to the surface via optical communication components 48, 50, 52, 54, 56, 58 and the wired communication link associated with pipe segment 62. This substantially real time information can then be used to alter or refine the planned frac pack treatment operation.

Even though FIG. 1 depicts a vertical well, it should be noted by one skilled in the art that the telemetry system of the present invention are equally well-suited for use in wells having other directional orientations such as deviated wells, inclined wells or horizontal wells. Accordingly, it should be apparent to those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Also, even though FIG. 1 depicts an offshore operation, it should be noted by one skilled in the art that the telemetry system of the present invention are equally well-suited for use in onshore operations or other dry tree installations.

Figure 6:
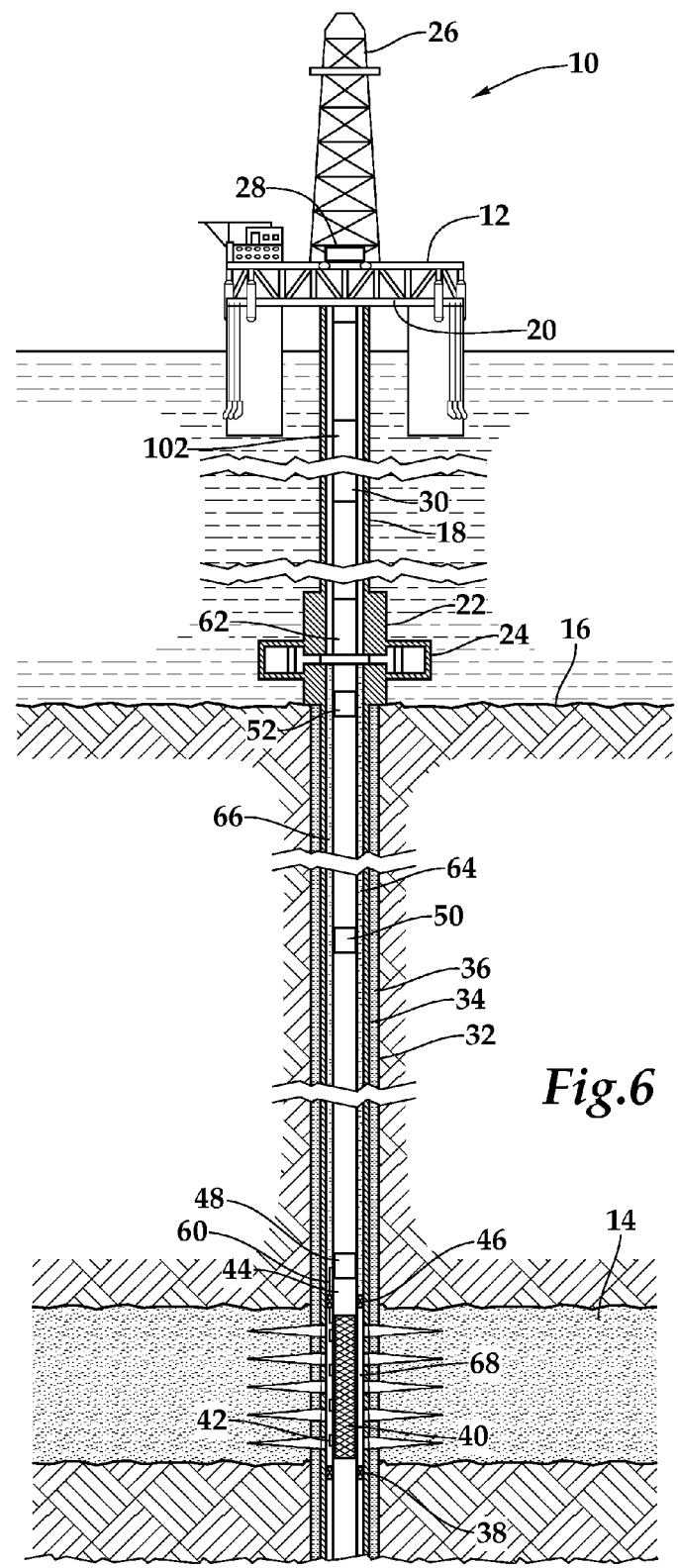
FIG. 6 is a schematic illustration of a offshore oil and gas platform positioned over a well that traverses a hydrocarbon bearing subterranean formation in which another embodiment of a downhole telemetry system of the present invention is operating.

As described above with reference to the wired communication link disposed within pipe segment 62, the optical communication components of the present invention can be integrated into a telemetry system the utilizes one or more other data transmission modes. As best seen in FIG. 6, a plurality of optical communication components 48, 50, 52 provide bidirectional optical communications via optically transmissive fluid medium 64 disposed within annulus 66 in the portion of the well below sea floor 16. As noted above, as blowout preventers 24 create a discontinuity in the optically transmissive fluid medium 64, use of another data transmission modes therethrough is desirable. As with the embodiment of FIG. 1, a wired communication link disposed within pipe segment 62 enables data transmission through blowout preventers 24. In this embodiment, however, the entire pipe string 102 from blowout preventers 24 to platform 12 supports a wired communication link. Use of this embodiment provides for a more economical telemetry system as compared to an entirely wired system by using optical communications in the wellbore below the sea floor while only using the wired system above the sea floor.

Figure 7:
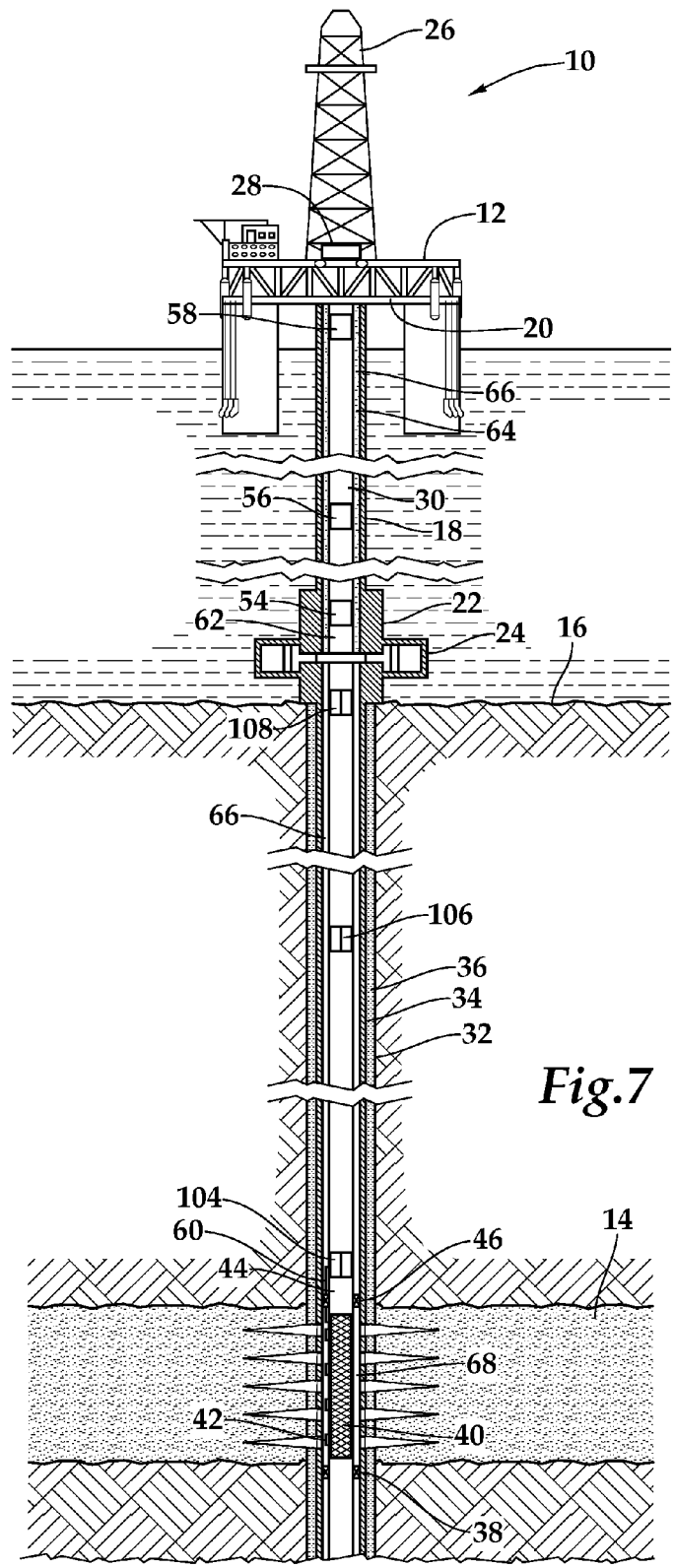
FIG. 7 is a schematic illustration of a offshore oil and gas platform positioned over a well that traverses a hydrocarbon bearing subterranean formation in which another embodiment of a downhole telemetry system of the present invention is operating.

Referring next to FIG. 7, therein is depicted another embodiment of a downhole telemetry system of the present invention that integrates optical communication components with other communication components that use different data transmission modes. In the illustrated embodiment, a plurality of optical communication components 54, 56, 58 provide bidirectional optical communications via optically transmissive fluid medium 64 disposed within annulus 66 in the portion of the well above sea floor 16. Below sea floor 16, the illustrated telemetry system utilizes a plurality of acoustic communication components 104, 106, 108. For example, acoustic communication components 104, 106, 108 may be electromechanical transducers which produce mechanical motion or force in response to a driving electrical signal and respond to mechanical force or motion applied to their mechanical connection by generating an electric field which produces a voltage on its electrical connection, such as a stack of piezoelectric disks. The piezoelectric disks may be formed from various crystalline materials, such as quartz, ceramic materials, PZT (lead-zirconate-titanate), ferroelectric, relaxor ferroelectric, electrostrictor, PMN and the like.

Upon electrical excitation, these transducers generate vibrations, i.e. acoustic waves, the work string 30 which provide a means of telemetering information. Specifically, after sensors 42 collect data, this data is encoded into an electrical waveform which drives the electromechanical transducer of acoustic communication component 104 which generates acoustic waves in work string 30 which travel up work string 30 and are received by acoustic communication component 106 this serves as an intermediate repeater. Acoustic communication component 106 retransmits the data by again generating acoustic waves in work string 30 which travel up work string 30 and are received by acoustic communication component 108. The received acoustic signals are converted back to electrical signals by each of the receiving transducer and decoded to recover the data obtained by sensors 42.

Acoustic communication component 108 feeds a digitally encoded electrical signal to the wired communication link disposed within pipe segment 62 which forwards the data carried in the electrical signal to optical communication component 54 for transmission to the surface via optical communication components 56, 58 and optically transmissive fluid medium 64 as described above. In this manner, an acoustic telemetry system can be used for data transmission downhole with the aid of the optical transmission mode of the present invention to overcome the problems associates with acoustic transmissions in the noisy environment provided in subsea conduit 18.

Figure 8:
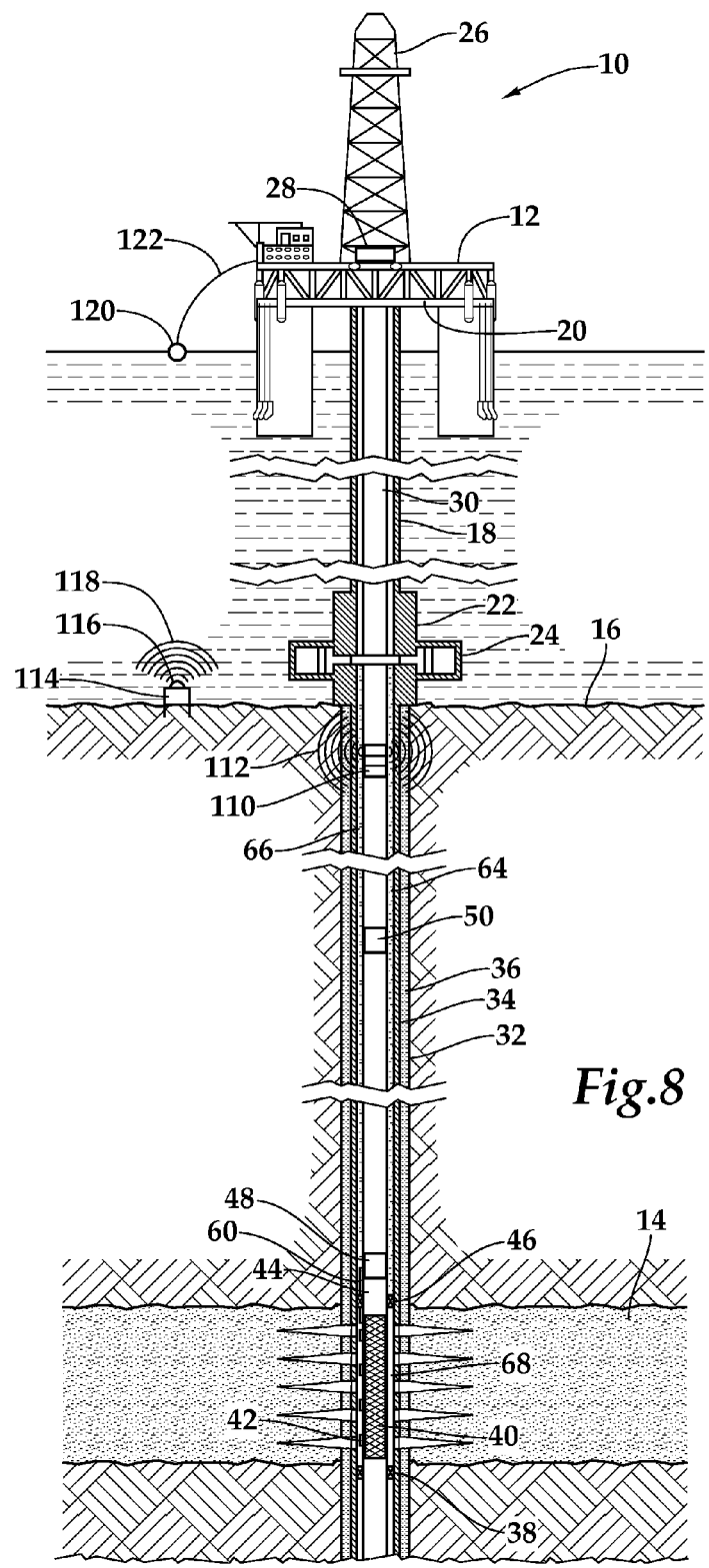
FIG. 8 is a schematic illustration of a offshore oil and gas platform positioned over a well that traverses a hydrocarbon bearing subterranean formation in which another embodiment of a downhole telemetry system of the present invention is operating.

Referring next to FIG. 8, therein is depicted another embodiment of a downhole telemetry system of the present invention that integrates optical communication components with other communication components using multiple data transmission modes. A plurality of optical communication components 48, 50 provide bidirectional optical communications via optically transmissive fluid medium 64 disposed within annulus 66 in the portion of the well below sea floor 16. In addition, communication component 110 not only has optical communication capabilities, but is also operable to retransmit a digital data stream via electromagnetic waves. Specifically, communication component 110 has a transducer for converting the digitally encoded optical data stream into an electrical signal that is processed to establish the frequency, power and phase output that is fed to an electromagnetic transmitter.

The electromagnetic transmitter may be a direct connect type transmitter that utilizes an output voltage applied between two electrical terminals that are electrically isolated from one another to generate electromagnetic waves 112 that are radiated into the earth carrying the information obtained by sensors 42. Alternatively, the transmitter may include a magnetically permeable annular core, a plurality of primary electrical conductor windings and a plurality of secondary electrical conductor windings which are wrapped around the annular core. Collectively, the annular core, the primary windings and the secondary windings serve to approximate an electrical transformer which generates electromagnetic waves 112.

Electromagnetic waves 112 travel through the earth and are received by subsea repeater 114 located on sea floor 16. Subsea repeater 114 may detect either the electrical field (E-field) component of electromagnetic waves 112, the magnetic field (H-field) component of electromagnetic waves 112 or both. As electromagnetic waves 112 reach subsea repeater 114, a current is induced in subsea repeater 114 that carries the information originally obtained by sensors 42. The current is fed to an electronics package within subsea repeater 114 for processing.

After the electrical signal has been processed, it is forwarded to a sonar modem 116 that will transform the electrical signal into sound waves 118. The information may be encoded into sound waves 118 by sonar modem 116 using, for example, frequency shift keying (FSK) or multiple frequency shift keying (MFSK). Sound waves 118 are transmitted through the sea carrying the information originally obtained by sensors 42. Sound waves 118 are then picked up by sonar modem 120 and forwarded to the surface via electric wire 122. As with each of the above described telemetry systems, the telemetry system described with reference to FIG. 8 may also be used as a downlink to communicate information from the surface to a downhole device.

While this invention has been described with a reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A multi-channel downhole telemetry system disposed within a wellbore comprising:
    a downhole transmitter located at a first position within said wellbore and operable to optically transmit a first data stream on a first optical channel and a second data stream on a second optical channel;
    a downhole receiver located at a second position within said wellbore and operable to receive the first data stream and the second data stream; wherein said first position within said wellbore is not within a line-of-sight of said second position within said wellbore, and
    an optically transmissive fluid disposed in the wellbore that provides a medium for the optical transmission of the first data stream and the second data stream between the downhole transmitter and the downhole receiver, the optically transmissive fluid containing suspended solids having refraction surfaces that scatter the optically transmitted data streams in the wellbore.

2. The system as recited in claim 1 wherein data transmissions on the first optical channel use a different wavelength than data transmissions on the second optical channel.

3. The system as recited in claim 1 wherein data transmissions on the first optical channel use a different monochromatic beam than data transmissions on the second optical channel.

4. The system as recited in claim 1 wherein the optical transmission of the first data stream and the second data stream between the downhole transmitter and the downhole receiver occurs simultaneously.

5. The system as recited in claim 1 further comprising a tubular string that supports the downhole transmitter and the downhole receiver and wherein the optically transmissive fluid is disposed in at least one of an annulus between the tubular string and the wellbore and an interior of the tubular string.

6. The system as recited in claim 1 wherein the downhole transmitter is positioned uphole of the downhole receiver.

7. The system as recited in claim 1 wherein the downhole transmitter is positioned downhole of the downhole receiver.

8. The system as recited in claim 1 wherein the first and second data streams further comprise at least one of surface commands and downhole data.

9. A multi-channel downhole telemetry system disposed within a wellbore comprising:
    a downhole transmitter located at a first position within said wellbore and operable to optically transmit a first data stream on a first optical channel and a second data stream on a second optical channel;
    a downhole repeater located at a second position within said wellbore, wherein said first position within said wellbore is not within a line-of-sight of said second position within said wellbore, the downhole repeater operable to receive the first data stream and the second data stream and to optically retransmit the first data stream on a third optical channel and the second data stream on a fourth optical channel;
    a downhole receiver located at a third position within said wellbore and operable to receive the first data stream and the second data stream; and
    an optically transmissive fluid disposed in the wellbore that provides a medium for the optical transmission of the first data stream and the second data stream between the downhole transmitter and the downhole repeater and for the optical retransmission of the first data stream and the second data stream between the downhole repeater and the downhole receiver, the optically transmissive fluid containing suspended solids having refraction surfaces that scatter the optically transmitted data streams in the wellbore.

10. The system as recited in claim 9 wherein data transmissions on the first optical channel use a different wavelength than data transmissions on the second optical channel and wherein data transmissions on the third optical channel use a different wavelength than data transmissions on the fourth optical channel.

11. The system as recited in claim 9 wherein data transmissions on the first optical channel use a different monochromatic beam than data transmissions on the second optical channel and data transmissions on the third optical channel use a different monochromatic beam than data transmissions on the fourth optical channel.

12. The system as recited in claim 9 wherein the optical transmission of the first data stream and the second data stream between the downhole transmitter and the downhole repeater occurs simultaneously.

13. The system as recited in claim 9 wherein the optical transmission of the first data stream and the second data stream between the downhole repeater and the downhole receiver occurs simultaneously.

14. The system as recited in claim 9 further comprising a tubular string that supports the downhole transmitter, the downhole repeater and the downhole receiver and wherein the optically transmissive fluid is disposed in at least one of an annulus between the tubular string and the wellbore and an interior of the tubular string.

15. The system as recited in claim 9 further comprising a plurality of downhole repeaters disposed within the wellbore between the downhole transmitter and the downhole receiver, each of the downhole repeaters operable to receive the first and second data streams and to optically retransmit the first and second data streams.

16. A multi-channel downhole telemetry method for transmitting data within a wellbore, the method comprising:
    disposing an optically transmissive fluid within the wellbore to provide a medium for optical transmission of data;
    optically transmitting a first data stream on a first optical channel through the optically transmissive fluid from a first location in said wellbore;
    optically transmitting a second data stream on a second optical channel through the optically transmissive fluid;
    scattering the optically transmitted data streams in the wellbore using refraction surfaces of suspended solids in the optically transmissive fluid;
    receiving the first data steam at a second location in said wellbore, wherein said first location within said wellbore is not within a line-of-sight of said second location within said wellbore;
    and receiving the second data stream.

17. The method as recited in claim 16 wherein optically transmitting the first data stream on the first optical channel and optically transmitting the second data stream on the second optical channel further comprise using different wavelengths for data transmissions on the first optical channel and data transmissions on the second optical channel.

18. The method as recited in claim 16 wherein optically transmitting the first data stream on the first optical channel and optically transmitting the second data stream on the second optical channel further comprise using different monochromatic beams for data transmissions on the first optical channel and data transmissions on the second optical channel.

19. The method as recited in claim 16 wherein optically transmitting the first data stream on the first optical channel and optically transmitting the second data stream on the second optical channel occur simultaneously.

20. The method as recited in claim 16 wherein, after receiving the first and second data streams, optically retransmitting the first data stream on a third optical channel through the optically transmissive fluid and optically retransmitting the second data stream on a fourth optical channel through the optically transmissive fluid.

* * * * *